United States Patent [19]
Mohn

[11] 4,220,237
[45] Sep. 2, 1980

[54] BOTTLE CARRIER FOR A LABELING MACHINE

[75] Inventor: Hans-Werner Mohn, Kaarst, Fed. Rep. of Germany

[73] Assignee: Jagenberg Werke Aktiengesellschaft, Düsseldorf, Fed. Rep. of Germany

[21] Appl. No.: 939,932

[22] Filed: Sep. 6, 1978

[30] Foreign Application Priority Data

Sep. 9, 1977 [DE] Fed. Rep. of Germany ....... 2740657

[51] Int. Cl.[2] ....................... B65G 29/00; B65G 47/24

[52] U.S. Cl. .................................... 198/377; 156/567; 198/344

[58] Field of Search ................ 198/344, 377; 156/567, 156/571, DIG. 13, DIG. 26

[56] References Cited

U.S. PATENT DOCUMENTS 2,015,639 9/1935 Titus ................................ 198/344 X
2,657,816 11/1953 Everett ............................ 156/567 X

FOREIGN PATENT DOCUMENTS 1258784 1/1968 Fed. Rep. of Germany .

*Primary Examiner*—Jeffrey V. Nase
*Attorney, Agent, or Firm*—Sprung, Felfe, Horn, Lynch & Kramer

[57] ABSTRACT

A bottle carrier for a labeling machine has a plurality of bottle plates which are rotated about their own axes by a drive as the bottle carrier rotates. The drive is controlled by a control arm guided in a fixed cam. Each bottle plate has a drive shaft connected thereto and about which the bottom plate rocks. A socket in the bottle carrier is provided for each drive shaft and a friction wheel drive is disposed between each drive shaft and the corresponding socket. The friction wheel drive includes a cage to which the control arm directly transmits the rocking movements prescribed by the cam.

5 Claims, 2 Drawing Figures

BOTTLE CARRIER FOR A LABELING MACHINE

BACKGROUND

The invention relates to a bottle carrier for a labeling machine having a plurality of bottle plates, which during the rotation of the bottle carrier are swung about their own axes by a drive, the drive being controlled by a control arm guided by a stationary cam.

In a known bottle carrier of this kind, on the drive shaft of each rotating plate there is a pinion which meshes with a toothed segment pivotally mounted in the bottle carrier and controlled by a cam follower. Since the toothed segment can be rotated by no more than 90°, the transmission ratio between the toothed segment and the pinion must be such as to obtain the required rotation of the bottle plate of approximately 270°. Such a rotation of the bottle plate is necessary in order to bring the label transferred from the gripper cylinder to the bottle may be pressed fully against the bottle by the stationary brushes upon the further transport of the bottles.

In this known bottle carrier, the free play in the bearings of the bottle plate and toothed segment and in the meshing of the teeth is disadvantageous in the transfer of the labels from the labeling cylinder to the bottles, because, due to the free play, the desired rotatory positioning of the bottle can be achieved only imprecisely. Another disadvantage is the considerable complication of construction and the variety of bearings which make maintenance difficult, and the engagement of the teeth (lubrication problems). Lastly, it is disadvantageous that expensive assembly and disassembly work is necessary for the replacement of worn parts.

THE INVENTION

The invention has the object of creating a bottle carrier of the initially mentioned kind, which will have a simplified drive.

This object is achieved in accordance with the invention in that between the drive shaft of each bottle plate and the corresponding socket in the bottle carrier there is disposed a ball or roller bearing friction wheel drive, to whose cage the control arm directly transfers the rotatory movement produced by the cam.

In this bottle carrier of the invention, only a single bearing is present, which simultaneously performs the step-up transmission corresponding to that of the toothed segment and pinion of the drive in the known bottle carrier. In the case of the maximum angle of rotation of 90° by the control arm guided by the stationary cam, it is brought about by the rollers or balls on the annular friction surfaces of different diameter that the bottle plate will perform, for a 90° cage rotation angle, a substantially greater rotation of, for example, 270°. On account of the single bearing, maintenance involves little expense. The cost of manufacture is also comparatively low.

In a preferred embodiment of the invention, the socket, the friction wheel drive, the drive shaft and the cam follower can be installed in the bottle carrier as a unit. This easy-to-install design permits a rapid replacement of the parts.

Preferably, the balls or rollers of the friction wheel drive are supported at least on one conical friction surface of the shaft or socket, which is biased in the axial direction. This assures that the rollers or balls will always engage the friction surfaces with a given force and that free play occurring in operation will be compensated. The bias is best produced by means of a spring, especially a plate spring.

In a further development of the invention, the friction wheel drive consists of two sets of balls or rollers disposed axially side by side.

BRIEF DESCRIPTION OF THE DRAWINGS

The invention will be further explained with the aid of the appended drawings representing an embodiment thereof, wherein.

DETAILED DESCRIPTION OF THE INVENTION

Figure 1:
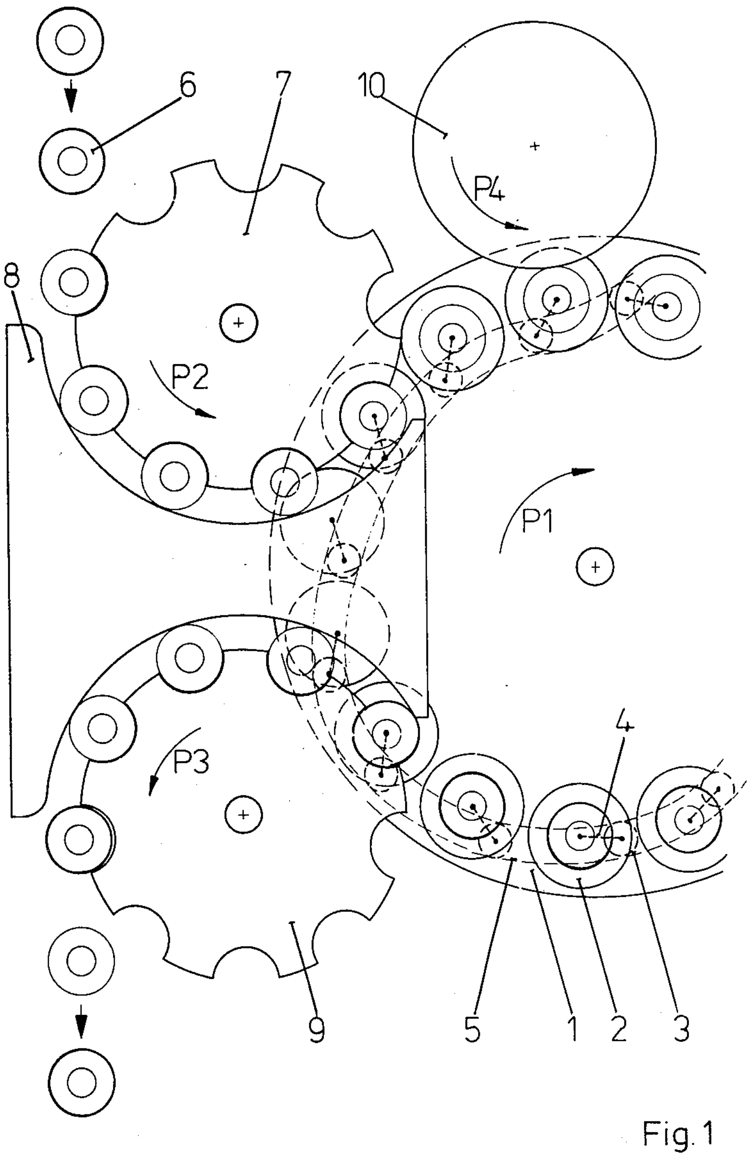
FIG. 1 is a diagrammatic top plan view of a bottle carrier and FIG. 2 is an axial cross-sectional view of a drive for a turntable of the bottle carrier.

Referring now to FIG. 1, a plurality of bottle plates or turntables 2 are rotatably mounted on a bottle carrier 1 revolving in the direction of the arrow $P_1$. The turntables 2 are rotated by means of a drive which is to be explained in detail later on, and which is controlled by a control arm 4. The roller 3 is guided in a stationary cam 5 and is swung back and forth by this cam 5 by an angle of about 90° about the axis of the bottle plate 2.

Bottles 6 which are to be labeled are fed successively to the bottle carrier 1, by an infeed wheel 7 rotating in the direction of the arow $P_2$ and provided with the guide means 8, and are placed on the bottle plates or turntables 2. By a biasing means acting on the bottles, which is not shown, they are urged against the bottle plate 2 which is provided with a slip-proof covering, so that they move with the rocking movement of the bottle plate 2. On their way to an outfeed wheel 9, which rotates in the direction of the arrow $P_3$ and has a corresponding guide means 8, the bottles first pass by a gripper cylinder 10 rotating in the direction of the arrow $P_4$, which places the labels disposed on its circumference onto the bottles brought into a particular rotational orientation. As they continue on their way, the bottles pass stationary brushes, which are not shown, rotating as they pass, so that the labels are brushed fully against the bottle.

Figure 2:
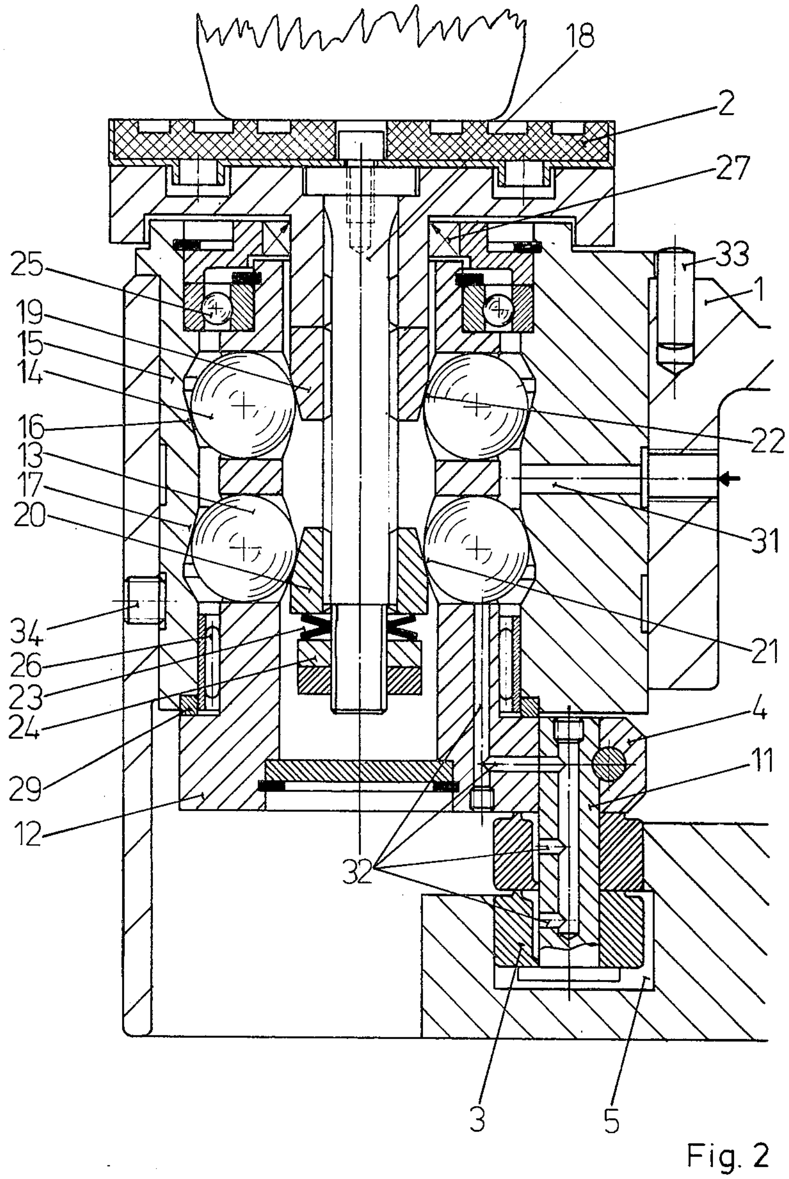

In the drive represented in detail in FIG. 2, the roller 3 is a divided roller, one part of which rolls against one side of the stationary cam 5, which is a slotted-type cam, and the other rolls against the other side thereof. The rollers 3 are journaled on a shaft 11 which is integral with a cage 12 for two sets of balls 13 and 14 disposed one above the other. The cage 12 with balls 13, 14, forms a part of a friction wheel drive including a socket 15 having tapered outer races 16, 17, and two cones 19, 20, corotationally disposed on the drive shaft 18 of the turntable 2 and having internal conical races 21, 22. While the upper cone 19 axially supports the bottom of the turntable 2, the lower cone 20 is supported on a plate spring 23, which in turn rests on a ring 24 held against axial displacement. The cage 12 is journaled at the top in a ball bearing 25 and at the bottom by a roller bearing 26 in the socket 15 fixedly mounted in the bottle carrier 1. The interior of the socket 15 is sealed from the exterior by various seals 27, 29. Lubricants can be fed to the interior of the socket and hence to the bearings 25 and 26 and the friction wheel drive through a passage 31. The interior is furthermore connected by additional passages 32 to the bearings of the rollers 3, so that these can simultaneously be lubricated. A pin 33 serves for the antirotational fastening of the socket 15 in the carrier 1.

The drive of the invention operates in the following manner:

The cage 12 is rocked back and forth by approximately 90°, according to the configuration of the cam 5. Since the outer friction surfaces 16, 17 have a greater circumference than the inner friction surfaces 21, 22, a stepping up of the rocking movement is obtained at the drive shaft 18, so that, for example, in the case of a 90° rotation of cage 12, the shaft 18 with the bottle turntable 2 performs a 270° rocking movement. Since the turntable drive is limited to only a single bearing and the meshing of teeth is eliminated, the rocking movement of the control arm is transmitted to the turntable 2 virtually without free play. The drive together with the control arm and the rollers 26 can be replaced as a complete unit. All that is necessary is to release the means 34 which fastens socket 15 in bottle carrier 1. The unit can then be lifted upward and removed.

It will be appreciated that the instant specification and claims are set forth by way of illustration and not limitation and that various changes and modifications may be made thereto without departing from the spirit and scope of the present invention.

What is claimed is:

1. In a bottle carrier for a labeling machine having a plurality of bottle plates which are rotated about their own axes by a drive as the bottle carrier rotates, the drive being controlled by a control arm guided in a fixed cam, the improvement wherein each bottle plate has a drive shaft connected thereto and about which the bottle plate rocks, a socket in the bottle carrier for each drive shaft and a friction wheel drive disposed between each drive shaft and the corresponding socket and including a cage to which the control are directly transmits the rocking movements prescribed by the cam.

2. The bottle carrier according to claim 1, wherein the socket, the friction wheel drive, the drive shaft and the control arm are insertable as a unit into the bottle carrier.

3. The bottle carrier according to claim 1, wherein each friction drive wheel comprises one of balls and rollers supported at least on one conical friction surface of the drive shaft and the socket, which surface is biased in the axial direction.

4. The bottle carrier according to claim 3, wherein the friction surface is under spring bias.

5. The bottle carrier according to claim 1, wherein the friction wheel drive comprises two sets of one of balls and rollers disposed axially side by side.

* * * * *